United States Patent [19]

Hull et al.

[11] Patent Number: 5,063,731
[45] Date of Patent: Nov. 12, 1991

[54] BRUSH AND TREE CUTTER BLADE

[76] Inventors: Harold L. Hull, 401 Canyon Way #43, Sparks, Nev. 89434; Wendell Johnson, 8049 E. Coronado Rd., Scollsdale, Ariz. 85257

[21] Appl. No.: 583,695
[22] Filed: Sep. 17, 1990
[51] Int. Cl.$^5$ .............................................. A01D 34/73
[52] U.S. Cl. ........................................ 56/295; 56/255; 144/2 N; 144/218; 144/241
[58] Field of Search ...................... 144/34 R, 2 N, 218, 144/241; 37/2 R; 56/255, 256, 295, DIG. 17

[56] References Cited

U.S. PATENT DOCUMENTS

| | | | |
|---|---|---|---|
| 3,483,905 | 12/1969 | Lawrence | 143/159 |
| 3,715,874 | 2/1973 | Goserud | 56/295 |
| 3,797,544 | 3/1974 | Ver Ploeg | 144/2 N |
| 4,010,805 | 3/1977 | Kelley | 172/698 |
| 4,110,959 | 9/1978 | Oosterling et al. | 56/295 |
| 4,690,183 | 9/1987 | Eilertson | 144/2 N |
| 4,738,090 | 4/1988 | Nichter | 56/295 |
| 4,744,148 | 6/1988 | Brown | 30/276 |
| 4,815,264 | 3/1989 | Mijnders | 56/295 |
| 4,881,438 | 11/1989 | Pinney | 83/840 |

FOREIGN PATENT DOCUMENTS 996007  8/1976  Canada .............................. 144/2 N

*Primary Examiner*—Hien H. Phan

[57] ABSTRACT

A brush and tree cutter blade adapted for mounting on a power-driven vehicle, the improvement being a spring loaded tooth mounted on each of three mounting plates with the mounting plates being hinged to the three sides of a triangular mounting plate. This arrangement allows the mounting plates to deflect upward or downward and the tooth to deflect inward when the tooth strikes an object such as a boulder or rock.

7 Claims, 3 Drawing Sheets

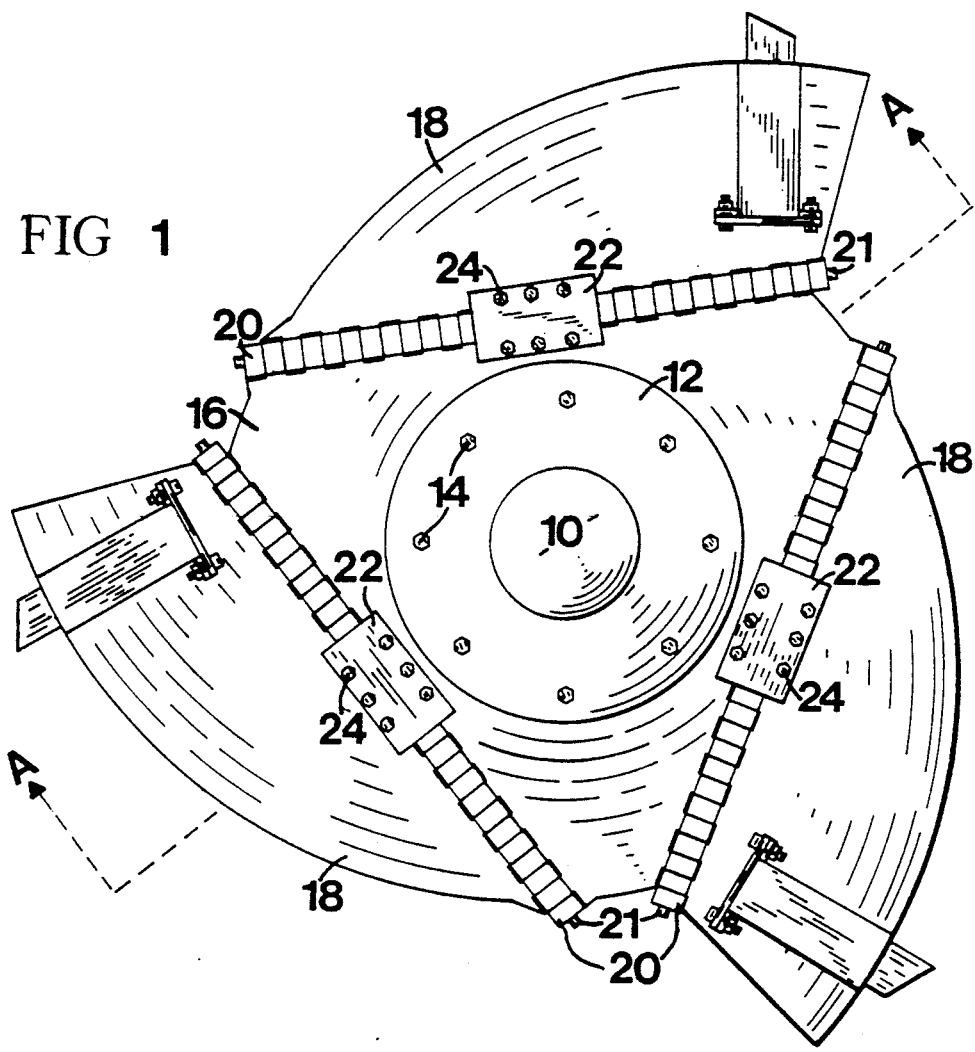
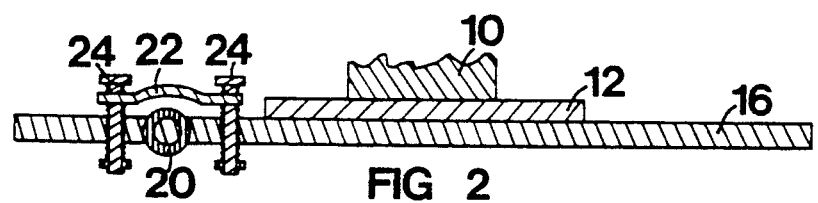

BRUSH AND TREE CUTTER BLADE

FIELD OF THE INVENTION

This invention relates generally to brush cutters and more particularly to a machine powered brush cutter blade arrangement which is flexible in two dimensions and allows the cutting teeth to deflex inward while its mounting plate can deflex upward or downward.

BACKGROUND OF THE INVENTION

Brush cutters are utilized in conjunction with construction activities as cable laying, road building, forest thinning, fire breaks, farming, etc. and are mounted on large tractor, power driven vehicles which are capable of propelling themselves through and over difficult terrain and many times encounter hidden objects such as boulders and rocks which traditional equipment strike with the cutting edge of the large, rotating cutting blade, causing damage to the teeth of the cutting blade. The mounting arrangement of the teeth on the rotary support member is generally rigid and on contact with an object such as a boulder or rock the teeth are damaged and must be replaced. This is time consuming and requires expensive replacement parts and labor. Also, the severe shock can damage other components on the vehicle such as hydraulic seals, bearings, etc., which can require a major overhaul.

SUMMARY OF THE PRESENT INVENTION

It is a primary object of the present invention to provide a new and improved cutter blade with teeth that are spring loaded.

Another object is to provide a mounting plate for the teeth which can be deflexed upward or downward.

Still another object is to provide means to replace the spring loaded teeth in the field by the operator in a minimum amount of time and effort.

Yet another object is to provide hinged mounts on the cutter blade mounting plate which can move upward or downward but in operation is held substantially in a horizontal plane by rotational centrifugal force.

Another important object is to provide hinged, multiple plates for the teeth that are designed substantially in the shape of a section of a circle with its outer end beginning substantially at the cutting tooth and terminating at its distal end nearer the center of its rotational mounting means.

Still another object is to provide limiting means for the hinged mounting plate.

Other objects and advantages will become apparent when taken into consideration with the following specifications and drawings.

BRIEF DESCRIPTION OF THE DRAWINGS

FIG. 1 is an overview of the mounting plate, showing three hinged sections with their respective spring-loaded, replaceable teeth.

FIG. 2 is a section of FIG. 1 taken at A—A.

DETAILED DESCRIPTION OF THE DRAWINGS

Figure 3:
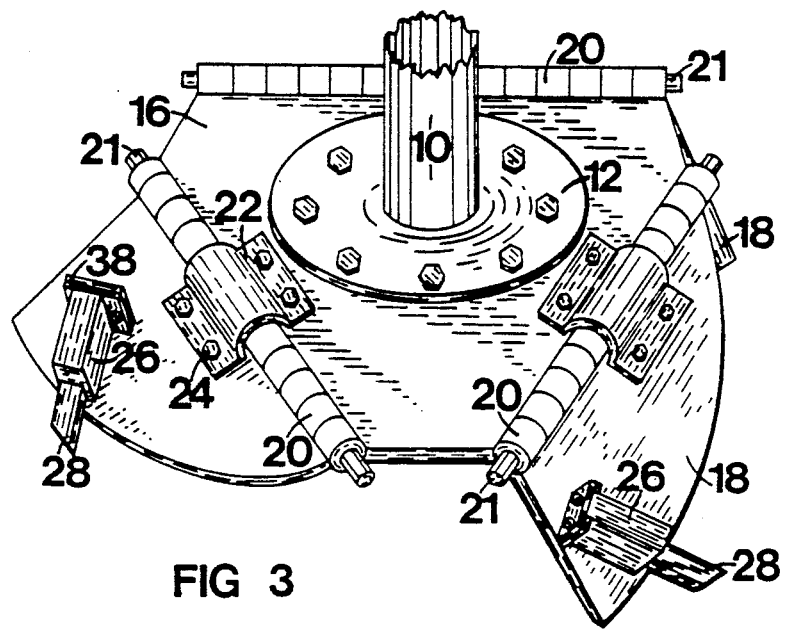
FIG. 3 is a perspective view.
Figure 4:
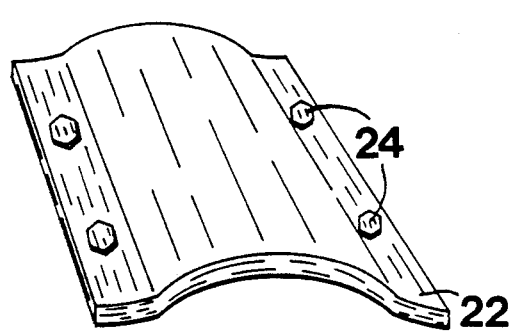
FIG. 4 is a perspective view of the limiting means.
Figure 5:
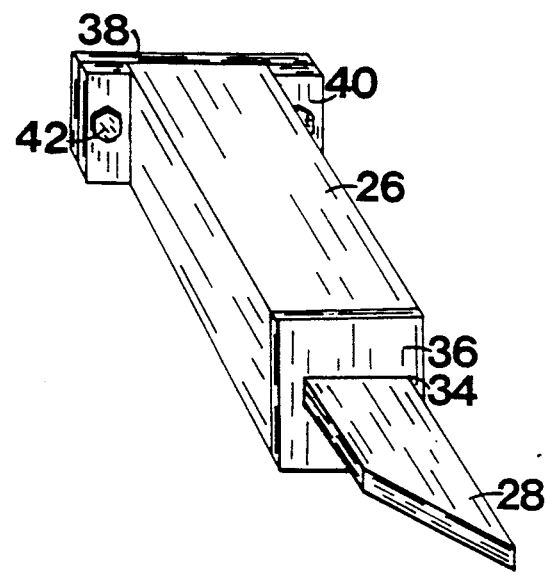
FIG. 5 is a perspective view of a tooth and tooth cage.
Figure 6:
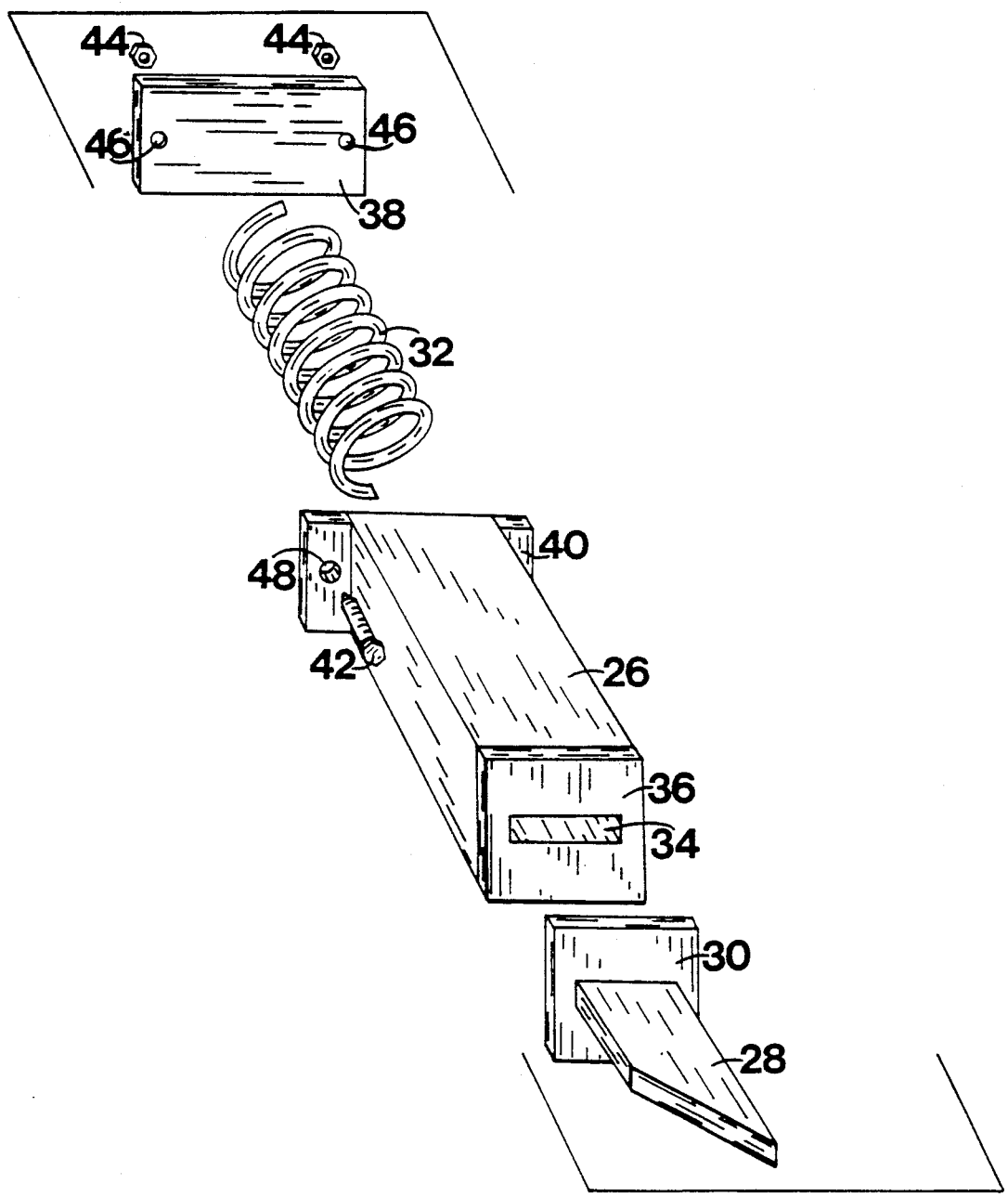
FIG. 6 is a perspective, exploded view of a tooth and tooth cage.

Referring now in detail to the drawings wherein like numerals designate like parts, 10 is a shaft associated with the power train of a vehicle (not shown) while 12 is a support mounting plate, mounted by multiple bolts 14 to the substantially triangular support plate 16, while 18 are mounting plates hinged to the triangular plate 16 by hinges 20 and hinge pins 21 with 22 being retainer plates to limit the axial movement of mounting plates 18 in relation to triangular support plate 16, and held in place by a loose fitting arrangement of bolts 24, while 26 is substantially a cage to house tooth 28, to allow linear movement of plate 36 and tooth 28, as allowed by spring 32, while 38 is a retainer plate anchored to end plate 40 of cage 26 and held in place by bolts 42 and nuts 44 through bolt holes 46 and 48 respectively. The cage 26 may be suitably affixed to the mounting plate 18 by welding, as the cage, mounting plates, teeth and support plates are made of heavy metal construction such as from ½" to 1" steel plate.

It will now be seen that as shaft 10 is rotated at suitable R.P.M. such as 600, that the mounting plates 18 will swing outward by centrifugal force to a substantially horizontal plane and cause the cutting teeth 28 to be in a position to cut through brush or trees or the like and yet if the teeth strike an object such as a boulder or a rock, the hinged arrangement between mounting plates 18 and triangular support plate 16, allow the mounting plate 18 to deflex upward or downward and teeth 28 to deflex inward via spring 32. It will also be noted that retaining plate 22 being held in a loose fitting relationship with mounting plates 18 and triangular support plate 16 by bolts 24 limits the amount of flexibility of hinged mounting plate 18. By tightening or loosening these bolts the amount of flexibility may be controlled.

It will also be noted that a damaged tooth may be replaced by removing two bolts.

Also the circular shape of the mounting plates allow brush and trees, etc., to enter the cutting zone before contact with the teeth.

What we claim and wish to protect by Letters Patent is:

1. A generally circular cutter blade for the cutting of brush and trees or the like, the improvement for such a cutter blade, comprising: a substantially triangular first mounting plate suitably mounted to and cooperating with a rotatable shaft, second mounting plates suitably hinged along each of the three straight edges of said triangular first mounting plate for pivoting relative to the first mounting plate about respective hinged axes, substantially rectangular cages, means to mount each of said cages to each of said second mounting plates, each of said cages having a first and second end, said first end being removably secured to one of said second mounting plates, said second end having a substantially rectangular opening, a substantially rectangular cutter tooth slidably mounted in each of said cages with its cutting edge protruding from said cage through said substantially rectangular opening of said second end of said cage, retaining means on one distal end of said cutter tooth to capture and hold said rectangular tooth in said cage in a position substantially parallel to the respective mounting plate, a spring, said spring being contained by said cage, one end of said spring engaging said first removably secured end of said cage while the other end of said spring engages said retaining means of said cutter tooth, whereby said cutter tooth is urged by said spring to extend outward from said cage and from the respective second mounting plate, limiting means to limit the amount of pivotal movement of said mounting plates relative to said triangular first mounting plate; said rotatable shaft, said triangular first mounting plate, said second mounting plates, said cages, said teeth, said springs and said limiting means cooperating together, whereby, when said shaft is rotated, said cutter teeth when engaging an obstacle can deflect inwardly, upwardly and downwardly.

2. The device of claim 1 in which the outer edge of each of said second mounting plates is designed substantially in the shape of a section of a circle with one of its ends beginning substantially at the cutter tooth and terminating at its other end, said other end being nearer the center of the cutter blade.

3. The device of claim 1 in which said retaining means on the distal end of said cutter tooth is of a size and shape of a cross section of the inside of said cage, said cross section being taken widthwise.

4. The device of claim 3 in which said retaining means is welded to said cutter tooth.

5. The device of claim 1 in which said limiting means to limit the amount of pivotal movement of said second mounting plate to said triangular first mounting plate is a retainer plate substantially in the form of a rectangle, said rectangle having mounting holes along the edges of its two longer sides and being of a shape to cover and cooperate with a hinge connecting said triangular first mounting plate with each of said second mounting plates, said triangular first mounting plate having mounting holes matching said holes in said retaining plate and loose fitting bolts with nuts, adjustably attaching said retaining plate to said triangular first mounting plate and said second mounting plate.

6. The device of claim 1 in which means are provided to removably secure said first end of said cage and comprising bolts and nuts.

7. The device of claim 1 in which said means to mount said cage to said second mounting plate is by welding.

* * * * *